G. Walton,
Shingle Machine.
No. 100,223.    Patented Feb. 22, 1870.
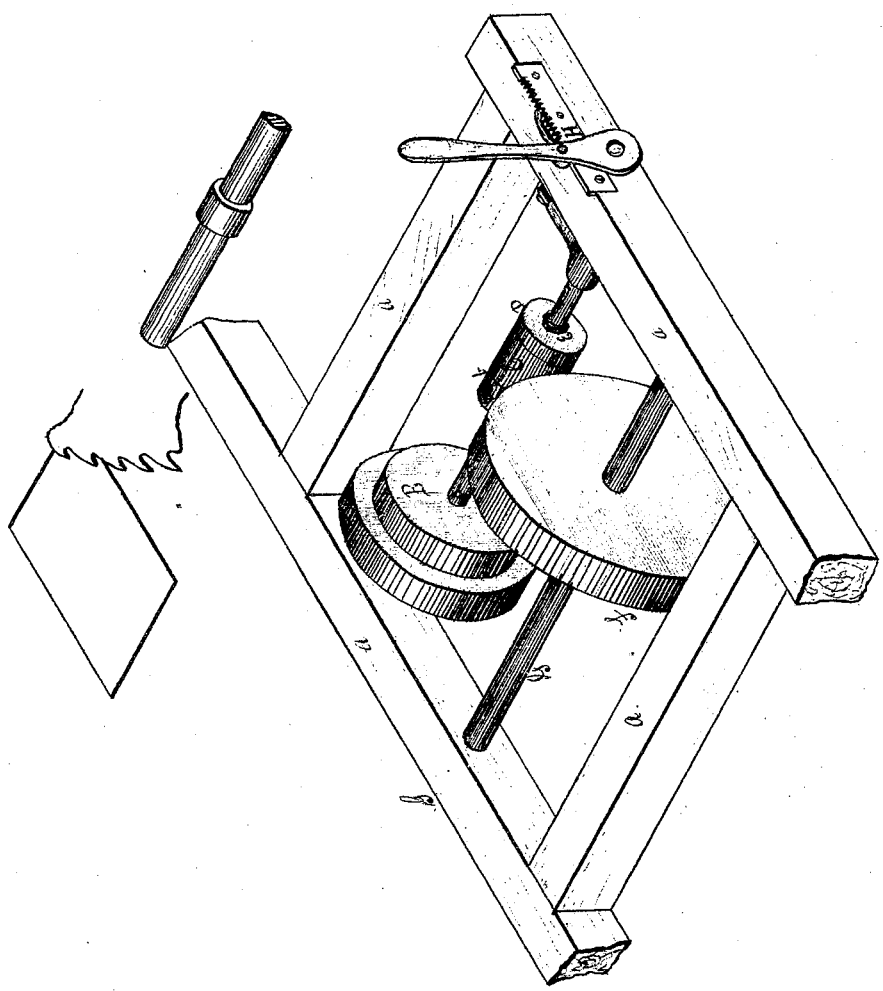
In presence of
C. A. Cutting
Chas. A. Eaton
Gustavus Walton.
Inventor

United States Patent Office.

GUSTAVUS WALTON, OF MINNEAPOLIS, MINNESOTA.

Letters Patent No. 100,223, dated February 22, 1870.

IMPROVEMENT IN SHINGLE-MACHINE.

The Schedule referred to in these Letters Patent and making part of the same

*To all whom it may concern:*

Be it known that I, GUSTAVUS WALTON, of Minneapolis, in the county of Hennepin, and State of Minnesota, have invented a new and useful Improvement in machinery for operating the "Feed Apparatus in Shingle-Machines;" and I declare the following to be a full and exact description thereof, reference being had to the accompanying drawings and letters of reference marked thereon, making part of this specification.

To enable others to make and use my invention, I will describe its construction and operation.

The accompanying drawing represents that portion of a shingle-machine which carries the power from the main or saw arbor to the feed apparatus.

*a a a a* is the wooden frame-work in which this portion of the machine is set.

A is an iron arbor driven by belting from the saw arbor running on B.

C is a friction pulley-clutch of iron fitted on to A, with corresponding sectional pieces *b b*; over C are fitted washers of sole-leather sufficient to make a friction surface three or four inches in width.

These washers are firmly secured by the iron washer D and the nut E.

F is an iron friction-wheel on the arbor G of fifteen inches diameter and having smooth rim of width corresponding to the friction surface of washers on C.

When A is driven and C is brought against F by means of lever and ratchet at H, the motion is communicated at G, and the feed apparatus propelled by a small beveled gear at I.

The advantages of friction over gearing in this part of the machine are, the securing a more steady and even motion, and the avoiding the expense and delay incident to the breaking out of cogs, frequently happening when the feed-pinion strikes back into gear as the carriage motion is reversed.

I am aware that the various devices employed in my machine are not new, therefore I do not claim them separately; but What I do claim is—

The arrangement of feeding devices, consisting of the cone pulley B, shaft A, clutch *b*, leather-covered friction-wheel C, lever-pawl and ratchet H, iron friction-wheel F, shaft G, and frame *a a*, the whole being constructed as herein described for the purpose specified.

GUSTAVUS WALTON.

Witnesses:
C. A. CUTTING,
CHAS. A. EATON.